United States Patent [19]

Dickenson

[11] 4,042,073
[45] Aug. 16, 1977

[54] DISC BRAKE MECHANISM ACTUATING MEANS

[75] Inventor: William D. Dickenson, Auburn, Ind.

[73] Assignee: Dana Corporation, Toledo, Ohio

[21] Appl. No.: 690,427

[22] Filed: May 27, 1976

[51] Int. Cl.² .......................................... F16D 55/224
[52] U.S. Cl. .................................................. 188/72.9
[58] Field of Search .................. 188/18 A, 24, 106 F, 188/72.7, 72.9

[56] References Cited

U.S. PATENT DOCUMENTS

| | | | |
|---|---|---|---|
| 2,953,221 | 9/1960 | Lucien | 188/72.9 |
| 3,907,074 | 9/1975 | Rist | 188/72.9 |

*Primary Examiner*—Duane A. Reger
*Attorney, Agent, or Firm*—William J. Clemens

[57] ABSTRACT

In a disc brake mechanism having a caliper mechanism which is mounted on the axle housing and which has brake pads in embracing relation to a rotor, an actuating means for the brake includes a pair of oppositely extending "scissors-type" levers pivotally mounted on the caliper mechanism, the outer end of one of the levers being attached to an actuating cable and the outer end of the other one of the levers being attached to a sheath of the cable. Stop means is provided for preventing the movement of the other lever in the direction of movement of the cable when the cable is actuated. In one embodiment, a stop is formed on the caliper mechanism bracket for engaging the other lever and in another embodiment, a projection is formed on the other lever to engage a portion of the caliper mechanism bracket.

3 Claims, 5 Drawing Figures

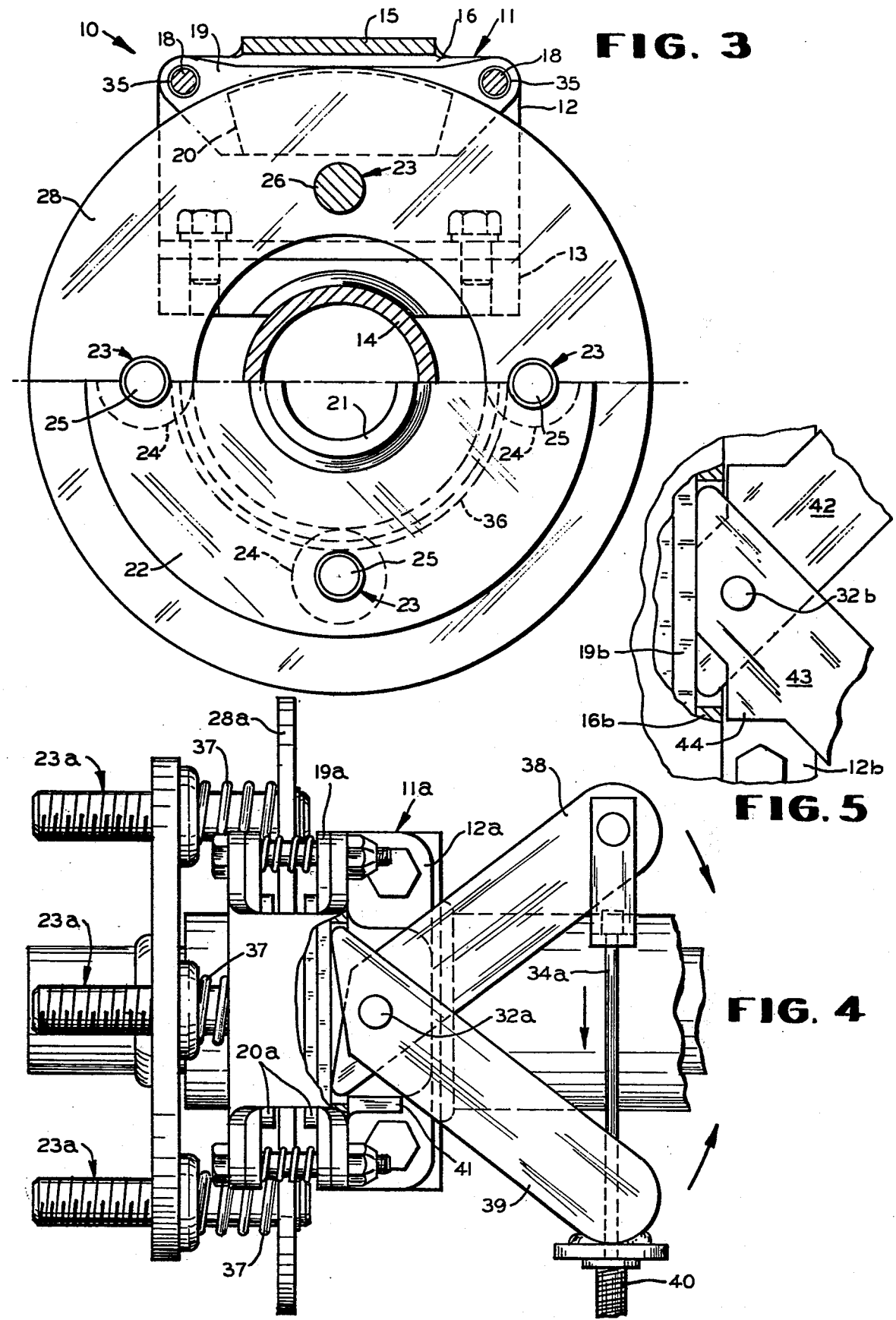

DISC BRAKE MECHANISM ACTUATING MEANS

BACKGROUND OF THE INVENTION

Numerous patents have been granted on actuating means for disc brake mechanisms embodying floating circular rotors which are mounted to rotate with the axle or the wheel of a vehicle. These rotors have portions of the peripheries thereof extending between braking plates having friction pads, the braking plates being mounted in so-called caliper mechanisms which are actuated to squeeze the braking plates and pads inwardly, grasping the rotors when the brake mechanisms are actuated to slow the vehicles.

One form of disc brake actuating means is a camming actuating lever pivotally supported by the caliper mechanism housing. The inner end of the lever is engaged with one of the braking plates and the outer end of the lever is attached to a cable. When the cable is actuated, the lever is rotated to first move one brake pad against the rotor and then move and brake pad to engage the other brake pad with the rotor.

In another form of disc brake actuating means, a pair of oppositely extending "scissors-type" levers are pivotally mounted on the caliper mechanism housing. The inner ends of the levers are engaged with one of the braking plates whereas the outer end of one lever is attached to a cable and the outer end of the other lever is attached to a sheath of the cable. When the cable is actuated, the two levers are rotated toward one another to force one brake pad and the rotor against the other brake pad. Such an actuating mechanism is disclosed in U.S. Pat. No. 2,953,221 issued to R. Lucien on Sept. 20, 1960.

SUMMARY OF THE INVENTION

One of the problems associated with the above-described two lever actuating means is a tendency of the levers to rotote in the direction of travel of the cable when the cable is initially actuated. The present invention concerns a stop means for holding the lever connected to the sheath in position to force the "scissors" motion to occur. In one embodiment, the stop means is a generally upstanding tab formed on the caliper mechanism bracket adjacent the levers for engaging the lever connected to the sheath to prevent its rotation in the direction of travel of the cable. In another embodiment, the stop means includes a projection formed on the lever connected to the sheath for engaging a portion of the caliper mechanism bracket.

It is therefore, the principle object of the instant invention to provide a "scissors-type" actuating means for a disc brake mechanism including a stop means for preventing the lever attached to the sheath from moving in the direction of travel of the cable when the cable is actuated.

BRIEF DESCRIPTION OF THE DRAWINGS

FIG. 3 is a sectional view of the brake mechanism taken along the line 3—3 of FIG. 2;

FIG. 4 is a fragmentary plan view of a brake mechanism according to an alternate embodiment of the present invention; and FIG. 5 is a fragmentary plan view of a second alternate embodiment of the present invention showing a portion of a brake actuating mechanism.

DESCRIPTION OF THE PREFERRED EMBODIMENT

Figure 1:
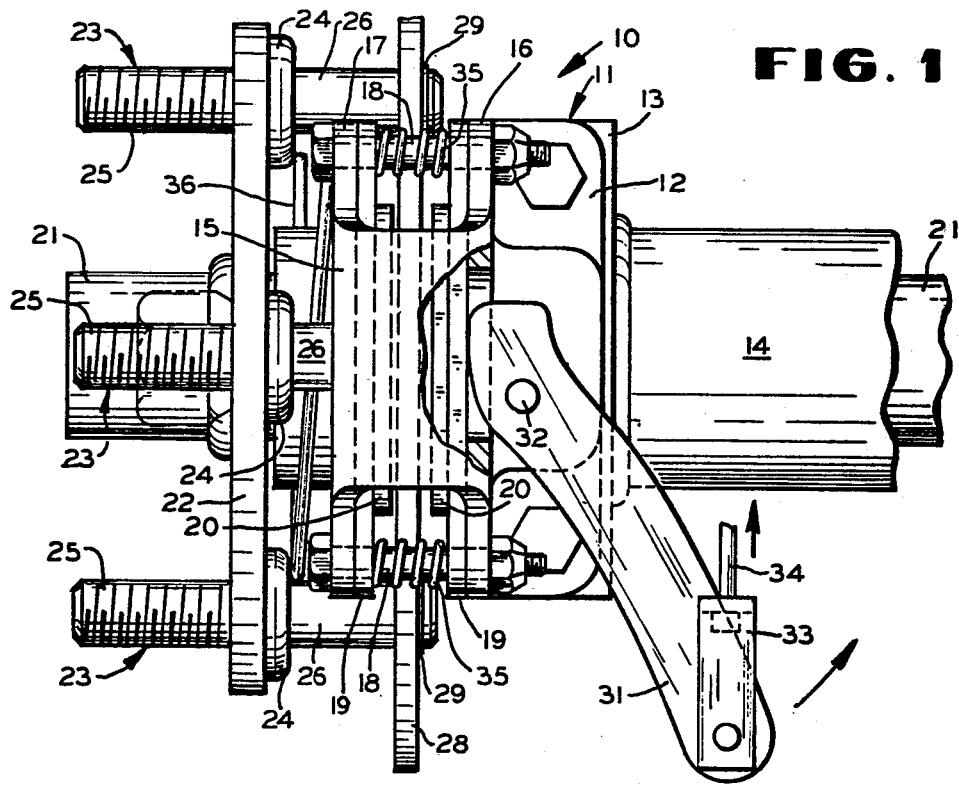
FIG. 1 is a fragmentary plan view of a brake mechanism according to the present invention illustrating a caliper mechanism actuated by a single actuating lever.

A disc brake mechanism having a single actuating lever is generally indicated by the reference number 10 and includes a caliper mechanism 11 that is supported by an angle bracket 12. The bracket 12, in turn, is mounted by a saddle 13 which is illustrated as being welded to the upper side of an exterior axle housing 14. The bracket 12 also includes a "U"-shaped bridge 15 having depending arms 16 and 17 between which there extend a pair of guide pins 18. The guide pins 18 slidingly mount opposed brake plates 19. A brake pad or shoe 20 is mounted on the inner side of each of the brake plates 19 in conventional fashion.

An axle 21 is journalled in the axle housing 14 and extends outwardly from the open end of the axle housing 14. An annular, disc-like axle hub 22 is mounted adjacent the outer portion of the axle and welded rigidly thereto for rotation with the axle 21. A plurality of wheel studs 23, in this illustrated embodiment there are four, extend axially through closely fitting apertures in the hub 22, being spaced radially outwardly from the axle 21 and evenly spaced circumferentially therearound. Each of the studs 23 is rigidly mounted in the hub 22 by a welded collar 24 and each of the studs has an outer end 25 which is threaded to receive a wheel mounting nut (shown in phantom), and an inner end 26.

The inner ends 26 of the wheel studs 23 are not threaded and extend through similarly shaped holes 27 in a flat annular rotor 28. The rotor 28 thus is mounted for rotation with the axle 21, axle hub 22 and wheel studs 23 and is axially slidable on the inner ends 26 of the studs 23. The rotor 28 has such diameter that a portion of its periphery extends into the space between the brake pads 20 so that it can be grasped frictionally by the brake pads 20 when the brake mechanism is actuated. The rotor 28 is positioned between the brake pads by snap rings 29 which fit into grooves 30 near the innermost ends of the inner ends 26 of the studs 23.

Figure 2:
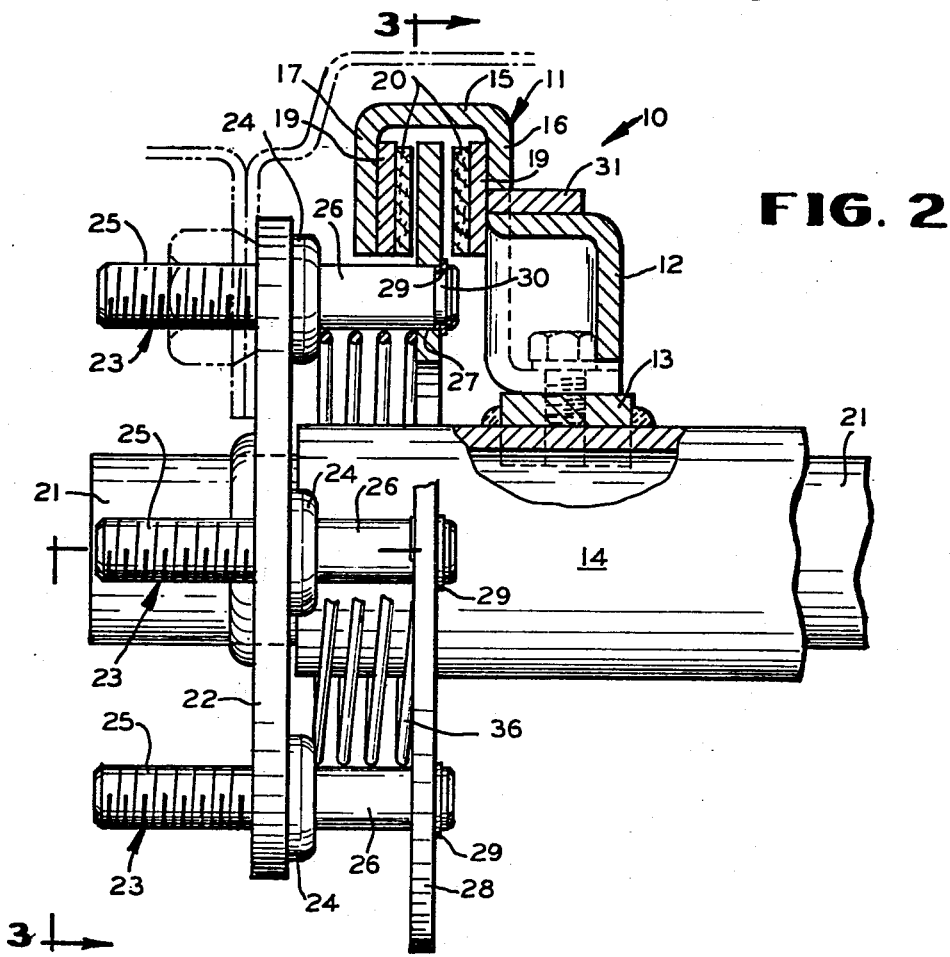
FIG. 2 is a fragmentary front elevational view of the brake mechanism of FIG. 1.

In the disc brake mechanism illustrated in FIGS. 1, 2 and 3, the brake mechanism 10 includes an actuating lever 31 pivotally mounted by a pin 32 erected on a portion of the bracket 12. The outer end of the lever 31 is connected by a yoke 33 to an actuating cable 34 leading to a convenient position in a vehicle where it is connected to a suitable brake lever which the operator can actuate. The inner end of the lever 31 bears against the outer side of the inner one of the brake plates 19.

When the brake is not actuated, the brake plates 19 and, therefore, the brake pads 20 are held separated from each other by coil springs 35 that are mounted on the brake plate guide pins 18 and bear against the inner sides of the opposed brake plates 19. When the lever 31 is rotated in the direction of the arrow, its inner end pushes the inner brake plate 19 toward and into contact with the inner side of the rotor 28 and, continued brake plate 19 and into contact with the inner side of the rotor 28 and, continued movement of the lever 31 slides the rotor 28 on its guides, i.e. the inner smooth ends 26 of the wheel studs 23, until the outer side of the rotor 28 engages the outer brake pad 20. Continued pressure on the actuating lever 31 thus pinches the rotor 28 between the brake pads 20 creating a frictional resistance to continued rotation of the rotor 28 and the respective wheel thereby stopping the vehicle.

By the braking action just described, the rotor 28 has been moved axially outwardly away from the positioning snap rings 29 and, when the actuating lever 31 is returned to the position shown in FIG. 1, the rotor 28 has a tendency to remain outwardly spaced from the positioning snap rings 29. This would, in conventional brake mechanisms, have a tendency to create a drag against the rotation of the respective wheel.

However, in brake mechanism having a floating rotor, a large coil spring 36 can be located circumjacent the outer portion of the axle housing 14 and axially between the inner side of the axle hub 22, or its collar 24, and the outer side of the rotor 28 against both of which surfces it bears. Therefore, when the brake mechanism is released and the rotor 28 is freed to move axially on its guiding studs 23, the coil spring 36 expands to thrust the rotor 28 axially inwardly toward and against the positioning snap rings 29, in which position, as illustrated in FIG. 3, the rotor 28 is between but out of contact with either of the brake shoes 20.

The embodiment of the invention illustrated in FIG. 4 is generally similar to that of FIGS. 1, 2 and 3 except for the particular actuating mechanism shown and except for utilization of different springs for restoring a rotor 28a to a position midway between brake pads 20a carried by the caliper mechanism 11a. In the embodiment of FIG. 4, a smaller coil spring 37 is positioned around the inner ends of each of several wheel studs 23a so that thrust to return a rotor 28a to mid-point between and out of contact with the brake pads 20a is exerted by each of the several coil springs 37 after the braking mechanism is released.

In the embodiment of the invention illustrated in FIG. 4, the actuating mechanism for the brake consists of a pair of oppositely extending "scissors-type" levers 38 and 39 both of which are pivotally mounted by a pin 32a. The outer end of lever 38 is yoked to the end of a cable 34a which has a sheath 40. The sheath 40 is connected to the end of the actuating lever 39. The cable 34a and sheath 40 can be of the type generally referred to as Belden cable and they are led to a position adjacent the operator of the vehicle. However, in this case, the Belden cable comprising the sheath 40 and the cable 34a are configured with a sharp bend somewhere between the brake mechanism and the actuating position adjacent the operator. Therefore, when the operator pulls on the cable 34a, the sheath 40 is placed under strain which tends to elongate the sheath 40 by straightening it out, and thus it applies force to the lever 39 opposite the force applied to the lever 38 by the inner cable 34a. The levers 38 and 39 thus move toward each other and their inner ends both apply pressure to an inner brake plate 19a which cause the brake pads to grasp the rotor 28a and bring the vehicle to a stop.

When the operator pulls on the cable 34a, there is an intitial tendency for the levers 38 and 39 to both move in the direction of travel of the cable since the levers are pivoted on the pin 32a. However, a stop 41 is provided on the caliper mechanism 11a to hold the lever 39 in position and force the "scissors" motion to occur. If a bracket 12a on which the levers are mounted is a die cast part, the stop 41 can be generally upstanding tab formed integral therewith. If the bracket 12a is a stamped part, the stop 41 could be a separate tab welded thereto or could be a projection formed on the lever 39. There is shown in FIG. 5 an alternate embodiment of the present invention in which a pair of levers 42 and 43 are pivotally mounted by a pin 32b on a bracket 12b. The levers 42 and 43 are stamped parts and are identical so that only one configuration can be used as both levers. The lever 43 is formed with a projection 44 adjacent a wall 16b of the bracket 12b. When the operator pulls on the cable (not shown), the levers 42 and 43 will initially pivot about the pin 32b until the projection 44 engages the wall 16b. The lever 43 is thus prevented toward the lever 43. As the sheath (not shown) tends to straighten, both levers then move toward each other and their inner ends apply pressure to an inner brake plate 19b.

In summary, the actuating means for the brake includes a pair of oppositely extending "scissors-type" levers pivotally mounted on the bracket supporting the caliper mechanism. The outer end of one of the lever is attached to an actuating cable and the outer end of the other one of the levers is attached to a sheath of the cable. Stop means are provided on the caliper mechanism bracket for preventing the movement of the other lever in the direction of movement of the cable when the cable is actuated. In one embodiment, the stop means includes a generally upstanding tab formed on the caliper mechanism bracket adjacent the other lever to prevent its movement in the direction of movement of the cable. In another embodiment, the stop means includes a projection formed on the other lever for engaging a wall of the bracket to prevent the movement of the other lever in the direction of movement of the cable.

In accordance with the provisions of the patent statues, the principle and mode of operation of the invention have been explained and illustrated in its preferred embodiment. However, it must be understood that the invention may be practiced otherwise than as specifically illustrated and described without departing from its spirit or scope.

What is claimed is:

1. A disc brake mechanism having a pair of brake plates with brake pads that are carried by a caliper mechanism that is mounted on an axle housing comprising: in combination, a rotor adapted for rotation with the end of an axle external of the axle housing, a portion of the periphery of said rotor extending between the brake pads; spring means for urging the brake plates apart; means for actuating the caliper mechanism for axially squeezing the pads against said rotor, said actuating means including a pair of actuating levers that are pivotally mounted on a caliper mechanism bracket, the inner end of each of said levers being engaged with the inner one of the brake plates, the outer end of one of said levers being attached to an actuating cable and the outer end of the other one of said levers being attached to a sheath of said cable and stop means on the caliper mechanism bracket for preventing the movement of said other lever in the direction of movement of said cable when said cable is actuated.

2. A disc brake mechanism according to claim 1 wherein said stop means includes a generally upstanding tab formed on the caliper mechanism bracket adjacent said other lever to prevent movement of said other lever in the direction of movement of said cable.

3. A disc brake mechanism according to claim 1 wherein said stop means includes a wall of said caliper mechanism bracket and a projection formed on said other lever for engaging said wall of said bracket to prevent movement of said other lever in the direction of movement of said cable.

* * * * *

UNITED STATES PATENT OFFICE
CERTIFICATE OF CORRECTION

Patent No. 4,042,073                 Dated August 16, 1977

Inventor(s) William D. Dickenson

It is certified that error appears in the above-identified patent and that said Letters Patent are hereby corrected as shown below:

| | |
|---|---|
| Column 1, line 21 | Change "and then move and brake pad" to - - and then move the rotor and brake pad -- |
| Column 2, line 22 | Change "axle and" to - - axle 21 and - - . |
| Column 2 line 61 | Remove [and, continued brake plate 19 and into contact with the inner side of the rotor 28] - - . |
| Column 3, line 9 | Change "to create a drag" to - - create drag - - . |
| Column 3, line 11 | Change "in brake mechanism" to - - in a brake mechanism - - . |
| Column 3, line 14 | Change "or its collar 24" to - - or its collars 24 - - . |
| Column 3, line 16 | Change "surfces" to - - surfaces - - . |
| Column 3, line 54 | Change "19a which cause" to - - 19a which causes- - |
| Column 3, line 63 | Change "the stop 41 can be generally" to - - the stop 41 can be a generally - - . |
| Column 4, line 8 | Change "The lever 43 is thus prevented toward the lever 43" to - - The lever 43 is thus prevented (from further movement in the direction of the cable as the lever 42 is rotated) toward the lever 43 - - . |
| Column 4, line 16 | Change "of the lever" to - - of the levers - - . |

Signed and Sealed this

Fourteenth Day of February 1978

[SEAL]

Attest:

RUTH C. MASON           LUTRELLE F. PARKER
*Attesting Officer*      *Acting Commissioner of Patents and Trademarks*